March 13, 1973     J. W. FRANKLIN     3,720,337
LOAD HANDLING VEHICLES

Filed March 19, 1971     3 Sheets-Sheet 1

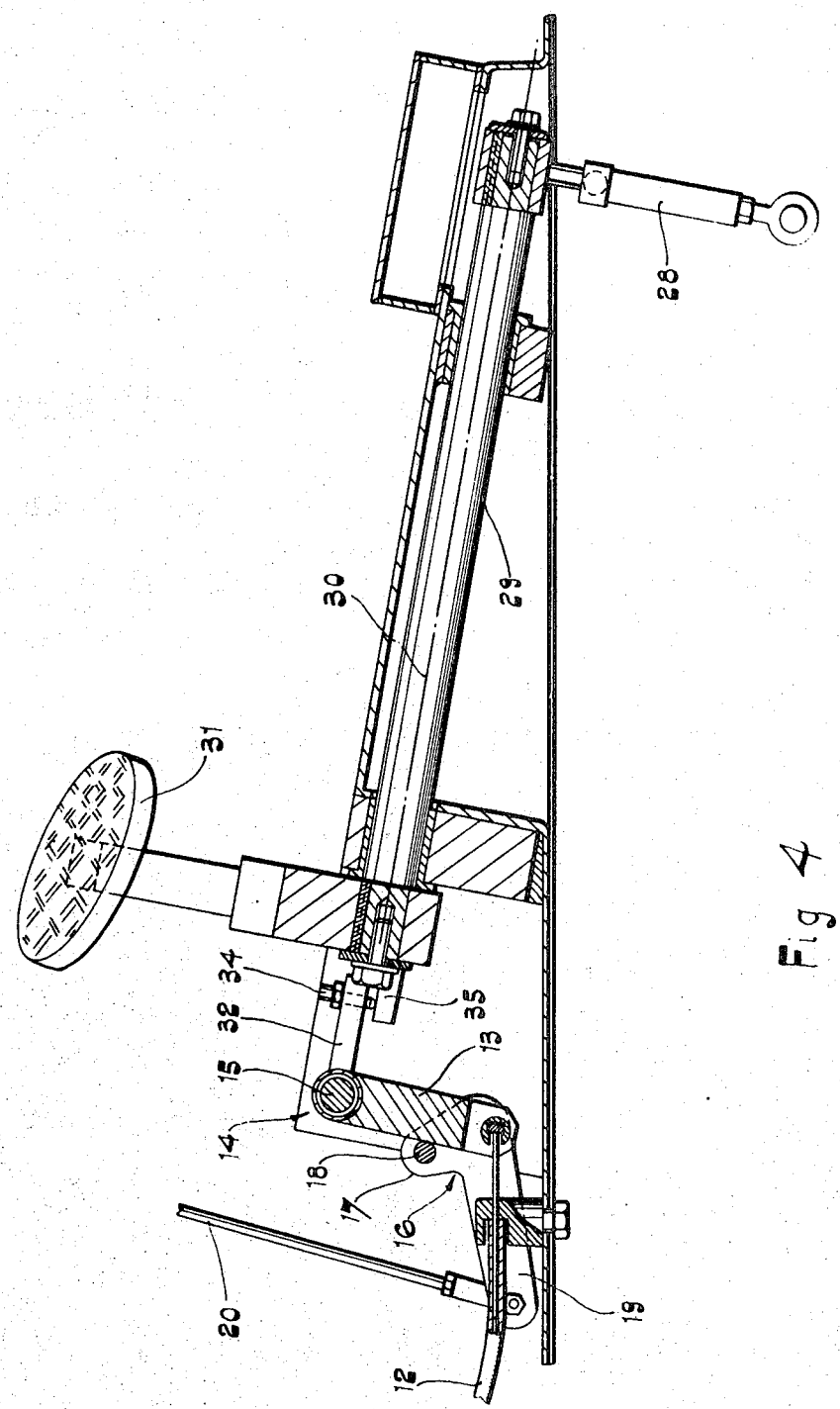

United States Patent Office 3,720,337
Patented Mar. 13, 1973

3,720,337
LOAD HANDLING VEHICLES
John Warrender Franklin, Coventry, England, assignor to Total (Power Hydraulics Limited, Pontardawe, Glamorgan, England
Filed Mar. 19, 1971, Ser. No. 126,085
Int. Cl. B66f 9/20
U.S. Cl. 214—674                    9 Claims

ABSTRACT OF THE DISCLOSURE

In a load handling vehicle, for example a fork lift truck, having a prime mover, hydraulically actuated load handling means, and a pump drivingly connected with the prime mover for supplying hydraulic fluid to the load handling means, a throttle or other power output control means of the prime mover is linked with a valve controlling actuation of the load handling means so that the power output of the prime mover is automatically increased when the load handling means is actuated.

SUMMARY OF THE INVENTION

The invention concerns load handling vehicles of the kind comprising a prime mover, hydraulically actuated load handling means arranged for raising and lowering a load and for supporting same on the vehicle, a pump drivingly connected with prime mover for supplying hydraulic fluid to the load handling means and hydraulic control means for controlling actuation of the load handling means.

Generally, such load handling vehicles are used in such a manner that during a considerable proportion of a period of use little or no power is required to be provided by the prime mover; yet intermittently during the period of use the prime mover is required to provide sufficient power for actuation of the load handling means, for example for raising a load from the ground to a position in which it can be transported by the vehicle. Accordingly, in cases where the prime mover is an internal combustion engine, the latter is provided with a governor which maintains the speed of the engine approximately constant at a value such that sufficient power is available for raising the maximum load which the vehicle is capable of handling. Maintenance of such an engine speed during the frequent intervals when little or no power is required from the prime mover contributes considerably to wear of the engine and to the rate of fuel consumption.

It is an object of the invention to provide a load handling vehicle of the kind referred to wherein the rate of wear of the engine and the rate of fuel consumption during use are substantially reduced as compared with known vehicles. According to the invention a power output control means for controlling the power output of the prime mover is linked with the hydraulic control means which controls actuation of the load handling means to provide automatically an increase in the power output of the prime mover when the load handling means is actuated to raise a load.

With this arrangement the prime mover can be arranged to operate slowly or at a low power output whilst little or no power is required, and the power output will automatically be increased when the load handling means is actuated.

In a case where the prime mover is an electric motor, the power output control means may comprise a rheostat for controlling the magnitude of the electrical current fed to the motor.

BRIEF DESCRIPTION OF THE DRAWINGS

FIG. 4 is a fragmentary view in side elevation and partly in section on the longitudinal centre line of the vehicle shown a linkage between the parts of FIG. 3, a transmission control means, and a throttle control cable.

DETAILED DESCRIPTION

Figure 1:
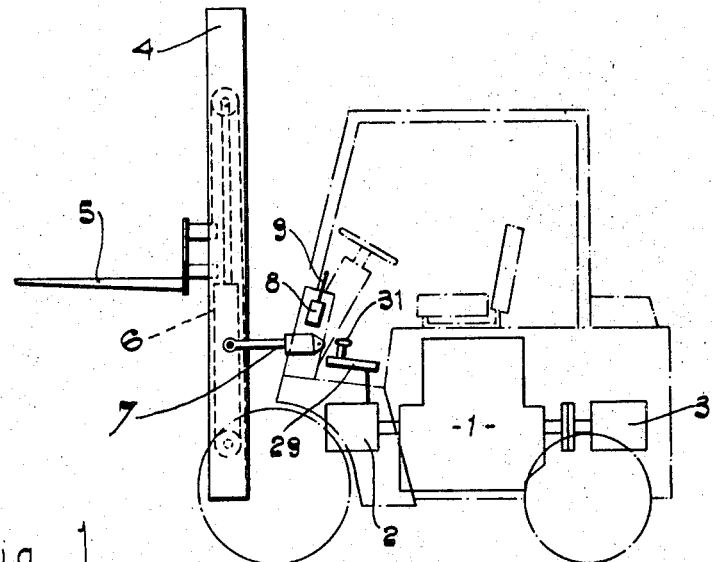
FIG. 1 shows diagrammatically the general arrangement of a fork lift truck.

The fork lift truck comprises a prime mover 1 which may be an internal combustion engine or an electric motor. At the forward end of, and drivingly connected with, the prime mover there is a hydraulic transmission pump 2, and at the rearward end of, and also drivingly connected with, the prime mover there is an hydraulic service pump 3. The transmission pump is connected by hydraulic ducts (not shown) with a pair of hydraulic motors (also not shown) drivingly associated with the front ground-engaging wheels of the truck.

The truck also includes a fork lift assembly comprising a mast 4 and forks 5 mounted on the mast for sliding movement upwardly and downwardly. An hydraulic piston and cylinder assembly 6, hereinafter referred to as the lift ram, is provided for controlling movement of the forks up and down the mast, and further piston and cylinder assemblies 7 are provided for controlling tilting movement of the mast about a transverse pivot axis at the lower end of the mast. One of the piston and cylinder assemblies 7 is provided at each side of the truck and these are hereinafter referred to as the tilt rams.

The lift and tilt rams are supplied with hydraulic fluid by the service pump 3 along ducts which are not shown in FIG. 1. A valve assembly 8 is provided for controlling the rate of flow of hydraulic fluid to the lift and tilt rams, and for controlling the direction of operation of these rams. The valve assembly is operated by two operating members 9 and 10 respectively which are conveniently situated on the truck for hand operation by an operator. The operating member 9 controls operation of the lift ram and is mounted for rocking movement in a direction fore and aft of the vehicle about an operating member axis 11 at its lower end. When the member 9 is in a datum position flow of hydraulic fluid to and from the lift ram is prevented and accordingly movement of the forks 5 upwardly and downwardly on the mast 4 is also prevented. When the member 9 is moved forwardly from the datum position hydraulic fluid is directed to the lift ram in such a manner as to lower the forks, and when the member 9 is moved rearwardly from the datum position hydraulic fluid is directed to the lift ram in such a manner as to raise the forks.

The operating member 10 controls flow of fluid to and from the tilt rams 7 and is similarly mounted for fore and aft rocking movement about the axis 11. When the member 10 is in a datum position the valve assembly 8 prevents flow of fluid to and from the tilt rams, thus holding the mast stationary relative to the remainder of the truck. When the member 10 is moved forwardly from the datum position the tilt rams are extended, and when the member 10 is moved rearwardly from the datum position the lift rams are contracted to tilt the mast rearwardly.

The truck further comprises power output control means including a control cable 12 operatively connected with a throttle in a case where the prime mover 1 is an internal combustion engine, or with a current regulating device in a case where the prime mover is an electric motor. An end of the control cable remote from the prime mover is connected with an arm 13 of a lower lever 14. The lower lever is mounted for pivoting movement about a lower lever axis 15 which extends transversely of the truck. The arrangement is such that movement of the lever in an anti-clockwise direction as seen in FIG. 4 causes an increase in the power output of the prime mover.

A middle lever 16 is mounted at a position adjacent to the lower lever for movement about an axis parallel to that of the lower lever. A first arm 17 of the middle lever extends generally upwardly from the middle lever axis and carries at its upper end a pin 18 which projects in a direction parallel to the axis 15 to a position immediately in front of the arm 13. A second arm 19 of the middle lever extends generally forwardly from the middle lever axis and the forward end of this arm is pivotally connected with a control rod 20 which extends generally upwardly to the region of the valve assembly 8, as will be described hereinafter.

Upward movement of the control rod 20 causes the middle lever 16 to pivot in a clockwise direction as seen in FIG. 4, and the pin 18 engages the arm 13 to pivot the lower lever in an anti-clockwise direction.

Figure 2:
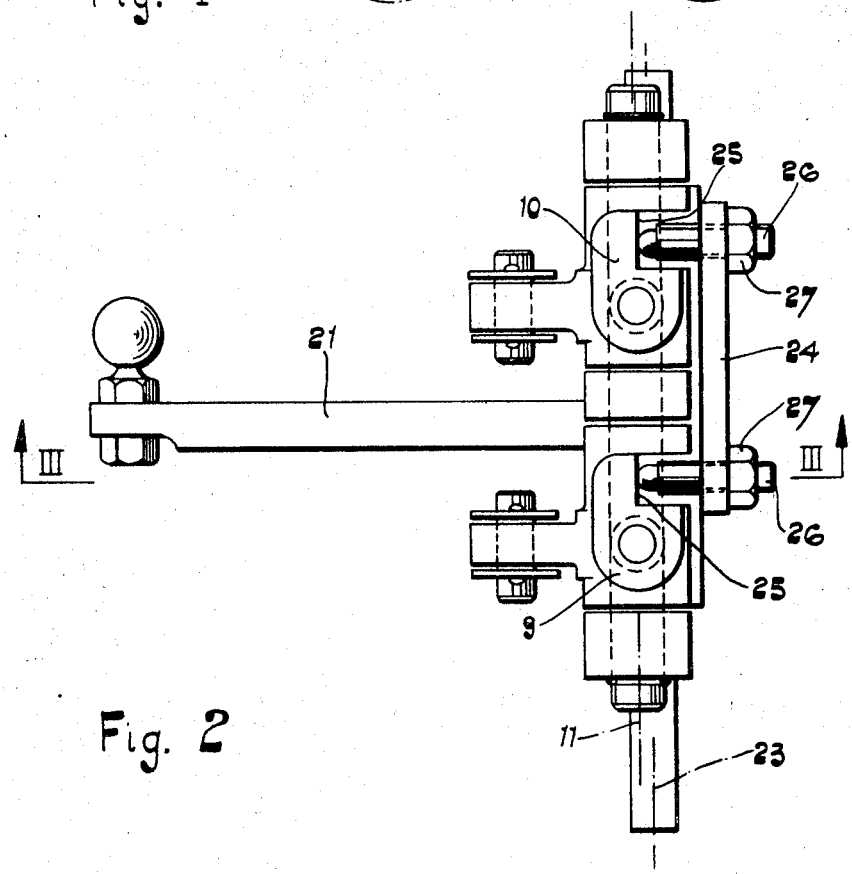
FIG. 2 shows the hand controls of the truck shown in FIG. 1, as viewed on the arrow II in FIG. 3.

The upper end of the control rod 20 is pivotally connected with a generally horizontally extending arm 21 of an upper lever 22 at a position spaced forwardly from an axis 23 about which the upper lever can rock. The upper lever axis 23 is parallel to the operating member axis 11 and the upper lever further includes an arm 24 which extends upwardly from the upper lever axis. The arm 24 is formed as a plate which extends laterally of the truck over a distance somewhat greater than the distance separating the operating members 9 and 10, as shown clearly in FIG. 2

Each of the operating members 9 and 10 presents a pair of abutment surfaces 25, these surfaces being disposed one above and one below the axis 11 of the operating members, and all of the abutment surfaces facing laterally of the axis 11 towards the arm 24. At positions opposite each of the abutment surfaces 25 the arm 24 is provided with apertures within each of which is located an adjustment bolt 26. The bolts 26 can be clamped in any required position of adjustment relative to the arm 24 by means of nuts 27. Normally the bolts are adjusted so that when each of the operating members 9 and 10 is in its datum position, each of the abutment surfaces 25 is in contact with an associated one of the bolts 26.

Figure 3:
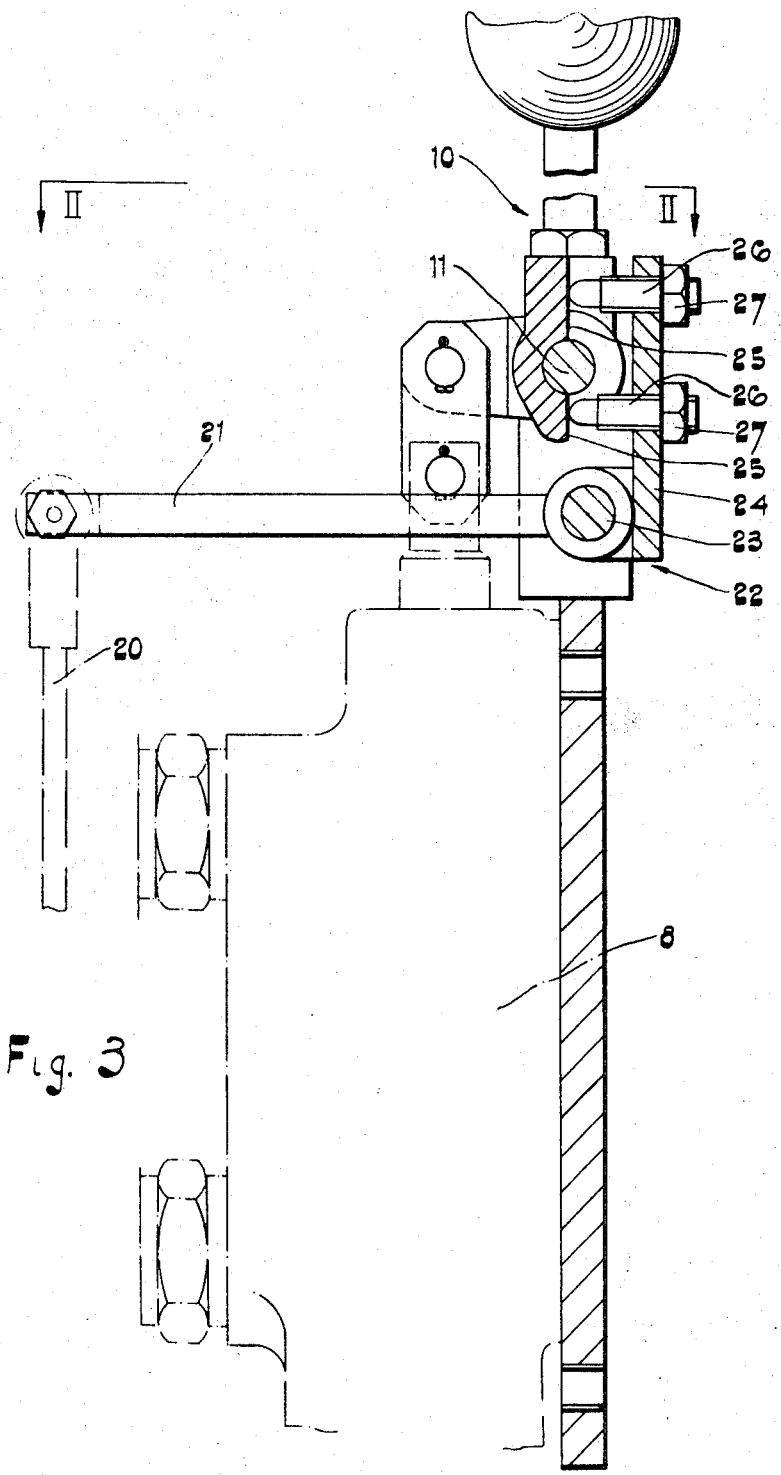
FIG. 3 shows in side elevation the parts of FIG. 2, together with the valve assembly operated thereby.

It will be noted that all of the positions at which the bolts 26 engage the abutment surfaces 25 are disposed at the same side of the axis 23 of the upper lever. Accordingly when either of the operating members 9 and 10 is moved from its datum position, the upper lever is rocked in a clockwise direction as viewed in FIG. 3 about the axis 23, irrespective of the direction of movement of the operating member. Such movement of the upper lever is transmitted through the control rod 20, the middle lever 16 and the lower lever 14 to the control cable 12 to move the latter in the direction of increasing power output of the prime mover.

A transmission control means is provided for varying the capacity of the transmission pump 2 and so varying the effective transmission ratio of the drive to the ground engaging wheels. The transmission control means includes an operating rod 28 which extends upwardly from the pump 2 and is pivotally connected with one end of an arm, the other end of which is secured to a rocker shaft 29. The rocker shaft is mounted in suitable bearing means for movement about a rocker axis 30 which extends generally fore and aft of the truck, and the arm to which the operating rod 28 is attached extends laterally of the shaft so that when the latter is rocked about its axis, the rod 28 is moved upwardly and downwardly. Foot pedals 31 are mounted on the rocker shaft 29, the foot pedals being disposed one on either side of the latter.

The lower lever 14 further includes second and third arms 32 which extend rearwardly from the lower lever axis 15 towards the forward end of the rocker shaft 29, the second and third arms being disposed one on either side of the rocker axis 30. An adjustment bolt 34 is carried within an aperture at the rearward end of each of the second and third arms of the lower lever, these bolts projecting towards respective plates 35 which are welded to the forward end of the rocker shaft 29, one on either side of the rocker axis 30. The upwardly presented faces of the plates 35 constitute abutment surfaces which are engaged by the adjustment bolts 34 upon rocking movement of the shaft 29 in either direction from a datum position. The bolts 34 can be clamped in any required position of adjustment relative to the arms 32, and normally a small clearance gap is provided between each of the adjustment bolts and the associated abutment surface when the rocker is in the datum position.

When the rocker shaft 29 occupies the datum position, the transmission pump 2 is in such a condition that no hydraulic fluid is permitted to flow to or from the wheel motors and movement of the truck is prevented. If an operator requires to drive the truck forwardly, one of the foot pedals 31 is depressed so rocking the shaft 29 in one direction from the datum position. This adjusts the pump 2 to supply fluid to the driving motors for rotating the ground-engaging wheels in a forward direction. When depression of the foot pedal exceeds a predetermined extent, one of the plates 35 engages the associated adjustment bolt 34 and causes the lower lever to move in an anti-clockwise direction about the axis 15, thereby operating the power output control means of the prime mover to increase the power output.

Depression of the other of the foot pedals 31 causes the transmission pump 2 to deliver hydraulic fluid to the wheel motors in a direction such that the wheels are driven reversely. A small depression of the foot pedal causes the wheels to be driven very slowly. Greater depression of the foot pedal increases the speed at which the wheels are driven and also produces movement of the lower lever 14 which is transmitted to the power output control means.

In a similar way, movement of either of the operating members 9 and 10 from the datum position is transmitted to the power output control means of the prime mover so providing automatically an increased power output when either the lift ram or the tilt rams is actuated.

A spring is provided for resiliently biasing the upper lever 22 and the middle lever 16 towards positions which correspond to a position of the power output control means which provides minimum power output from the prime mover. A return spring is provided for biasing the rocker shaft 29 to the datum position so that if the driver removes his feet from the pedals 31, the vehicle is brought to rest.

The prime mover can be arranged to run at a slow speed, commonly referred to as tick-over speed, whilst little or no power is required, and the power output will automatically be increased when it is required to operate the work lift unit or to drive the vehicle forwardly or rearwardly.

It will be appreciated that the adjustment bolts 26 could be provided on the operating members 9 and 10, instead of on the arm 24, and that the adjustment bolts 34 could alternatively be mounted on the plates 35, instead of on the arms 32.

It will be noted that movement of either of the operating members is not impeded by, and does not cause a corresponding movement of, the other operating member or the rocker shaft 29. Similarly, movement of the rocker shaft 29 is not impeded by, and does not cause a corresponding movement of, the operating members.

What is claimed is:

1. In a load handling vehicle comprising:
    (a) a prime mover,
    (b) load handling means for raising and lowering a load and for supporting same on the vehicle,
    (c) an hydraulic motor for actuating said load handling means,
    (d) a hydraulic pump drivingly connected with the prime mover, (e) duct means for conveying hydraulic fluid from the pump to the motor, and (f) hydraulic control means for controlling actuation of the load-handling means, the improvement wherein there is provided:

(g) power output control means for controlling the power output of the prime mover, and (h) a linkage kinematically associated with the power output control means and with the hydraulic control means whereby the power output of the prime mover is automatically increased over a continuous range proportional to the degree of actuation of the hydraulic control means when the hydraulic control means actuates the load handling means to raise a load.

2. A load handling vehicle according to claim 1 wherein:

(a) said hydraulic control means comprises valve means for controlling the flow of fluid along said duct means, (b) the valve means includes an operating member movable from a datum position in either of two directions which correspond to respective directions in which the motor can be operated, (c) said linkage is so arranged that the power output of the prime mover is increased when the operating member is moved from the datum position, irrespective of the direction of movement of the operating member.

3. A load handling vehicle according to claim 2 wherein:

(a) said linkage comprises a lever mounted adjacent to the operating member for movement about a lever axis, and operatively connected with the power output control means, (b) said operating member is mounted for rocking movement about an operating member axis parallel to the lever axis, (c) the operating member presents at respective positions off-set from the operating member axis on opposite sides thereof, a pair of abutment surfaces, both facing laterally of the operating member axis and engageable with an arm of said lever at respective positions thereon which lie on the same side of the lever axis, whereby rocking movement of the operating member from the datum position causes movement of the lever in the same direction about the lever axis, irrespective of the direction in which the operating member is rocked.

4. A load handling vehicle according to claim 3 wherein adjustment means is provided on one of the operating members and the lever for adjusting the angle between said arm of the lever and the operating member when the latter is in the datum position and is engaged by said arm.

5. A load handling vehicle according to claim 3 wherein:

(a) a plurality of hydraulic motors is provided for actuating said load handling means, (b) said valve means includes a plurality of operating members rockable about a common operating member axis, and (c) said arm of the lever is engageable by the abutment surfaces of any one of the operating members which is moved by an operator.

6. A load handling vehicle according to claim 3 wherein:

(a) the vehicle further comprises variable ratio hydraulic transmission means for transmitting drive from said prime mover to a driving wheel or wheels of the vehicle, (b) transmission control means is provided for varying the ratio of the transmission means, (c) said linkage further includes a rocker arranged for movement about a rocker axis in either direction from a datum position, (d) said transmission control means is operatively connected with the rocker for actuating the transmission control means for driving the vehicle forwardly or rearwardly according to the direction in which the rocker is moved from the datum position, (e) said linkage includes a further lever kinematically associated with:

(i) said lever which is engageable with the operating member, (ii) the power output control means, and (iii) the rocker, whereby movement of the rocker in either direction from the datum position actuates the power output control means to increase the power output of the prime mover.

7. A load handling vehicle according to claim 6 wherein said operating member is arranged for hand control by an operator and said rocker is arranged for foot control by the operator.

8. A load handling vehicle according to claim 1 further comprising:

(a) variable ratio hydraulic transmission means for transmitting drive from said prime mover to a driv- wheel or wheels of the vehicle, and (b) transmission control means for varying the ratio of the transmission means, the transmission control means also being kinematically associated with said linkage whereby the power output of the prime mover is automatically increased when the transmission control means is operated to drive the vehicle.

9. A load handling vehicle according to claim 1 wherein the load handling means is a fork lift assembly.

References Cited

UNITED STATES PATENTS 3,338,441   8/1967   Flint _____ 214—674
3,014,344   12/1961  Arnot _____ 214—674

GERALD M. FORLENZA, Primary Examiner

L. J. ORESKY, Assistant Examiner

U.S. Cl. X.R.

180—77 H; 187—9